J. W. MILNOR.
METHOD OF AND MEANS FOR CORRECTING FOR ALTERNATING CURRENT ELECTROMAGNETIC
INDUCTION AND FOR ALTERNATING CURRENT EARTH POTENTIAL.
APPLICATION FILED MAR. 10, 1917.
1,254,831.
Patented Jan. 29, 1918.
2 SHEETS—SHEET 1.
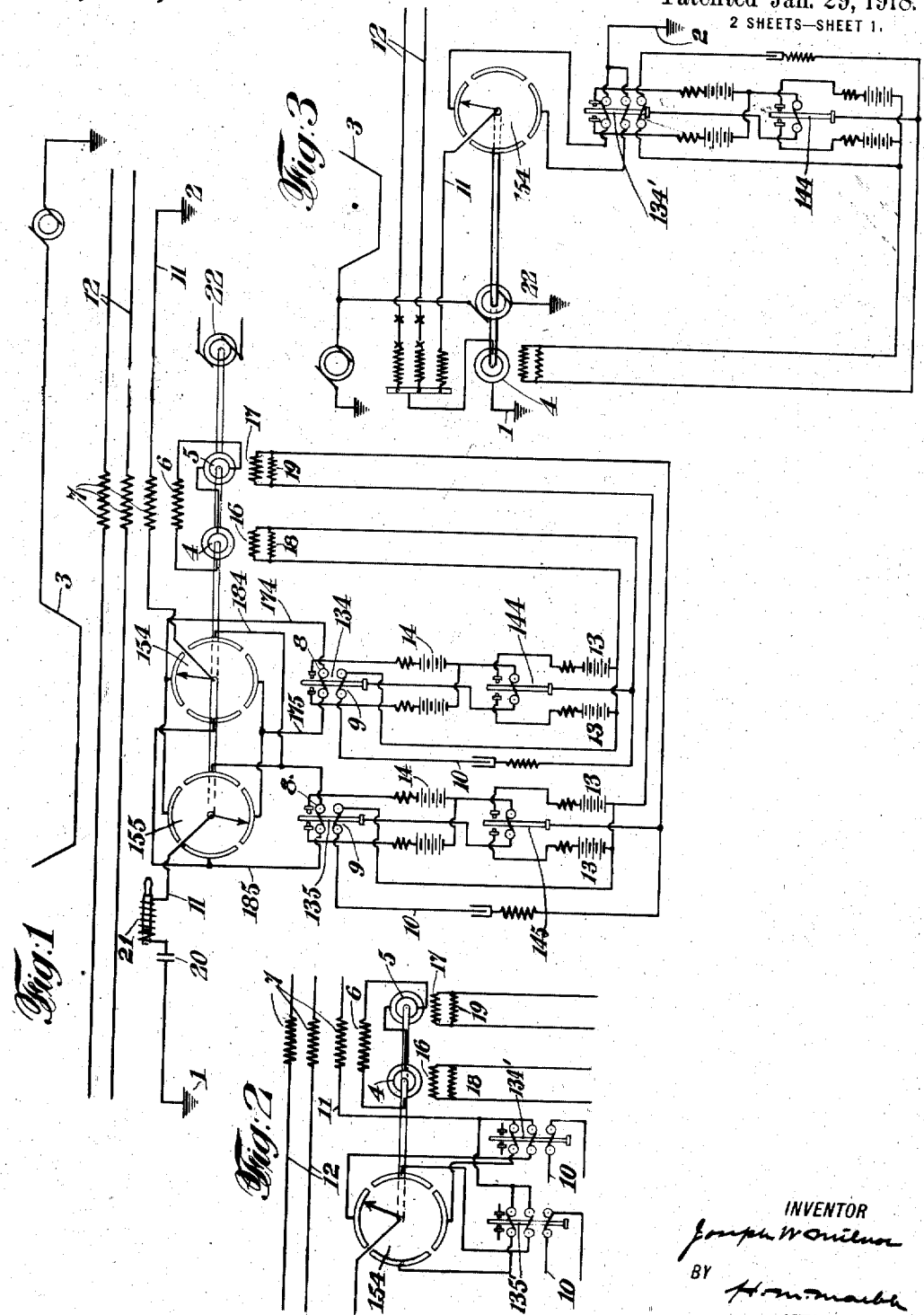
INVENTOR
Joseph W Milnor
BY
H m maubu
ATTORNEY J. W. MILNOR.
METHOD OF AND MEANS FOR CORRECTING FOR ALTERNATING CURRENT ELECTROMAGNETIC
INDUCTION AND FOR ALTERNATING CURRENT EARTH POTENTIAL.
APPLICATION FILED MAR. 10, 1917.
1,254,831.
Patented Jan. 29, 1918.
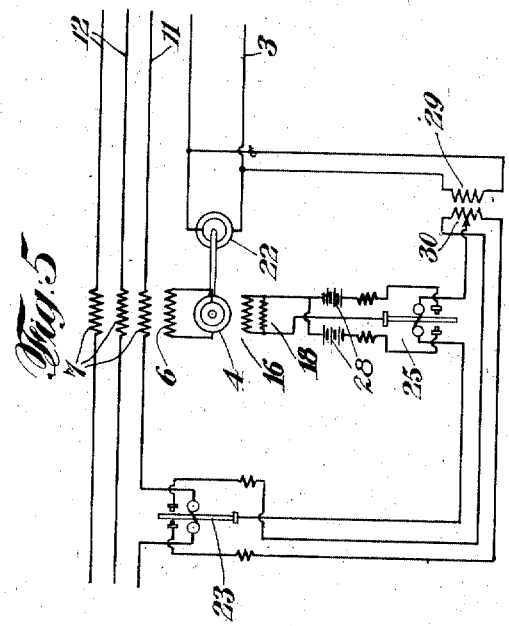
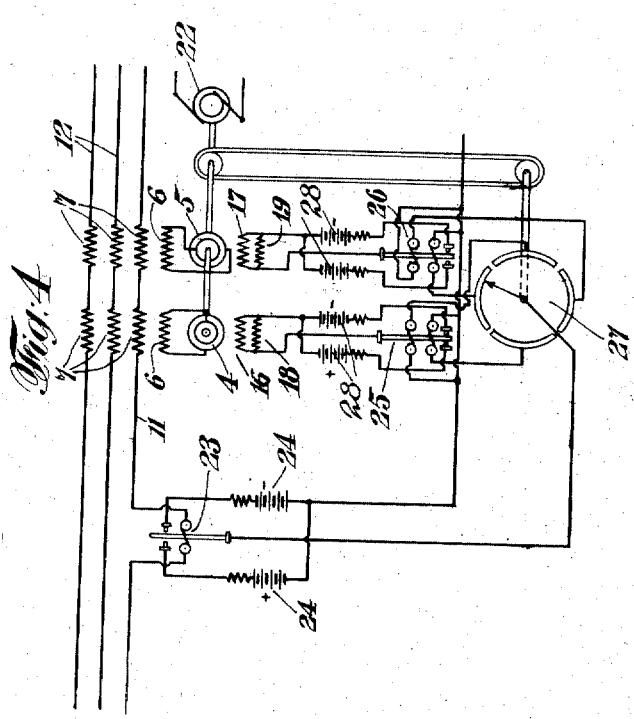
INVENTOR
Joseph W. Milnor
BY
ATTORNEY

UNITED STATES PATENT OFFICE.

JOSEPH W. MILNOR, OF NEW YORK, N. Y., ASSIGNOR TO THE WESTERN UNION TELEGRAPH COMPANY, OF NEW YORK, N. Y., A CORPORATION OF NEW YORK.

METHOD OF AND MEANS FOR CORRECTING FOR ALTERNATING-CURRENT ELECTROMAGNETIC INDUCTION AND FOR ALTERNATING-CURRENT EARTH POTENTIAL.

1,254,831.     Specification of Letters Patent.     Patented Jan. 29, 1918.

Application filed March 10, 1917. Serial No. 153,825.

*To all whom it may concern:*

Be it known that I, JOSEPH W. MILNOR, a citizen of the United States of America, and a resident of New York, in the county of New York and State of New York, have invented certain new and useful Methods of and Means for Correcting for Alternating-Current Electromagnetic Induction and for Alternating-Current Earth Potential, of which the following is a specification.

My invention relates to a method of and means for correcting for alternating current electromagnetic induction and for alternating current earth potentials in systems of electrical communication, such for example as telegraph and telephone systems, and as a method comprises applying a correcting potential equal in voltage and frequency to the disturbing influence, with automatic variation of such correcting potential in phase and in value, as circumstances may require; also other features as hereinafter described and particularly pointed out in the appended claims. As an apparatus, my invention comprises means, including alternating current generators and automatic regulating devices therefor, for applying to the communication circuit or circuits a correcting potential of proper voltage, phase, and frequency; also other features as hereinafter described and particularly pointed out in the appended claims.

The objects of my invention are to avoid disturbances in the operation of telegraph and other systems of communication, due to electromagnetic induction from neighboring alternating current circuits or generators or the like, or due to earth potential disturbance of an alternating current character; and to accomplish the above object by simple and inexpensive and automatic means.

I will now proceed to describe my invention with reference to the accompanying drawings, which illustrate circuits and apparatus embodying the apparatus portion of my invention and adapted for carrying out the method portion of my invention. In the said drawings:

Figure 1 is a diagram illustrating one method of and means for applying correction for disturbances due to electromagnetic induction.

Fig. 2 is a fragmentary diagram illustrating the use of one commutator or rotary rectifier only, for the two controlling relays here designated by numerals 134' and 135'.

Fig. 3 is a diagram illustrating the driving of the correcting generator, and its commutator or rotary rectifier, by a synchronous motor direct from the source of disturbance, and indicating the connection of the correcting apparatus to the terminal bus-bar of the system of communication, and also indicating the use of the correction apparatus for compensating for alternating current ground disturbance.

Fig. 4 is a diagram illustrating a simplified arrangement of correction apparatus, and Fig. 5 is another diagram illustrating a simplified correction apparatus wherein the correcting generator is driven from the source of disturbance and wherein the current for the operation of the field control relay is derived from a transformer.

In Fig. 1, numerals 12 designate communication wires or conductors, exposed to interference from an alternating current circuit 3, and 11 designates a "control wire," forming a part of the correcting system herein described, and which may be supposed to be carried upon the same pole line as conductors 12, or otherwise associated with the conductors 12 as to be exposed to the influence of the alternating current circuit 3 to substantially the same extent and in substantially the same manner as are conductors 12. It is to be noted that the alternating current disturbance may, and often will, be confined to a portion only of the total length of conductors 12, and therefore in general a control wire 11 is required only in the region in which the disturbance may exist. In Fig. 1, the arrangement shown is adapted for introducing correction at some intermediate point in the conductors 12. In another figure an arrangement is shown for introducing correction at terminal points of systems of communication.

1 and 2 designate earthing points of control conductor 11; 4 and 5 designate alternating current correcting generators, which are to be understood as to be driven at a speed appropriate to produce currents of about the frequency of the disturbing potential, generators 4 and 5 preferably differing in phase by about 90 degrees, so that by proper regulation of these two generators, and by combining their currents, they may together generate a voltage equal to the induced disturbing voltage, and of a phase such as to be exactly opposite in direction to the voltage induced from circuit 3 in conductors 11 and 12. 6—7 designate a transformer having its primary 6 in the circuit of generators 4 and 5, and its secondaries 7 in conductors 11 and 12; whereby the influence of the current generated by generators 4 and 5 is transferred to conductors 11 and 12, by induction.

154 and 155 designate commutators or rotary rectifiers, corresponding to and driven at proportional speed with relation to, correcting generators 4 and 5 respectively. 134 and 135 are controlling polar relays, and 144 and 145 are associated and coöperating polar relays; relays 134 and 144 corresponding to commutator 154 and generator 4, and relays 135 and 145 corresponding to commutator 155 and generator 5. Current in conductor 11 passes through the brush of commutator 154 to the segments of that commutator and through conductors 174 and 184, as the case may be, and magnet coils 8 of relay 134 or relay 135, as the case may be, and thence through conductor 175 or 185, as the case may be, through the segments and brush of commutator 155 and thence on through said conductor 11. Besides magnet coils 8, relays 134 and 135 have other magnet coils 9, in a circuit 10 connected to the armature of the corresponding associated relay, 144 or 145, and thence passing, through the one or the other of the two opposed contact stops of such relay, and through the one or the other of the two opposed batteries 13, back to such relay coil 9. Relays 144 and 145 are, in turn, controlled by the contacts of relays 134 and 135, respectively, through opposed batteries 14. It will be clear that each set of associated relays 134 and 144, or 135 and 145, constitutes a self-vibratory arrangement wherein the armatures of the two relays of each set are kept in rapid vibration, under control, however, of the magnet coils 8 of relays 134 and 135. Suitable regulating resistances and condensers are provided in connection with said relays.

16 and 17 designate the fields of generators 4 and 5 respectively; to which fields current is supplied from batteries 13 through the contact points and armature of the corresponding relay, 144 or 145, respectively. Since the two batteries 13 of each set are opposed, i. e., are connected in circuit oppositely, it will be clear that as each relay, 144 or 145, operates, current impulses of alternately opposite direction will be transmitted through the corresponding generator field coil, 16 or 17; and that energization of either field, in one sense or the other, will be prolonged if the armature of the corresponding relay, 144 or 145, linger against one or the other of its stops, so permitting the voltage of the generator to which that field belongs to build up. Such lingering of the armatures of relays 144 and 145 will be caused by lingering of the armature of the corresponding relay, 134 or 135, under the influence of current in conductor 11 passing through magnet coil 8.

Resistances 18 and 19 are provided, in shunt with respect to field coils 16 and 17, respectively, to avoid or reduce sparking at the relay contact points and to permit current to flow in such generator field coils 16 and 17 while the armatures of the corresponding relays are traveling across from one contact to the other.

The operation of the system as so far described is as follows:

If generators 4 and 5 are generating each the proper voltage to neutralize the disturbance experienced from induction from circuit 3, their current so generated, passing through the primary 6 of transformer 6—7, will induce in the secondaries 7 of that transformer currrents which will neutralize the disturbance from circuit 3, and no current will flow in magnet coils 8 of relays 134 and 135. If, however, the correction is not complete, then a current due to the disturbance will flow in conductor 11 through coils 8 of said relays. The commutators 154 and 155 partially or completely rectify this current, so that the coils 8 of relay 134, or of relay 135, or of both of said relays, receive a pulsating current which tends to hold the armature of the corresponding relay against one or the other of its contact stops until current has built up sufficiently in the field of the corresponding generator 4 or 5 to cause that generator to generate the correct voltage to neutralize the disturbance.

Conductor 11 is preferably tuned, as by a condenser 20 and inductance 21, to resonance to the frequency of the disturbance, so as to eliminate currents of other frequencies. This is desirable, but not essential.

The vibratory action of relays 134 and 144, or 135 and 145, prevents the impressing on circuits 11 and 12 of a voltage oscillation due to a species of "hunting" action of the generators 4 and 5 themselves. But for the vibratory action of these relays, each generator, when its field coil is excited, might increase its voltage until, as a result of overcorrection of the disturbance, it itself introduced a disturbance; whereupon the voltage produced by the generator would decrease—and probably too far; whereupon another building up of voltage would begin. But the vibratory action of the relays prevents this, such vibration being at a rate very much in excess of the period of the voltage oscillation due to the hunting action of the generators, so that each generator has no opportunity to build up a material voltage unless the armature of the corresponding relay, 134 or 135, is held in contact with one of its corresponding stops, under control of the corresponding coil 8, for a time sufficient for voltage to build up. The method of and means for preventing impressing of a voltage oscillation by hunting action of the correcting generator or generators, involving the vibratory action of the relays, is covered in a companion patent application, Serial No. 153,822.

It is of course possible to use one commutator 154, instead of the two commutators 154 and 155 illustrated in Fig. 1; and the single commutator arrangement is illustrated in the fragmentary Fig. 2; it being understood that the circuits and instruments of this figure are the same as in Fig. 1, except for the slight changes with respect to conductor 11 occasioned by the provision of a single commutator only, and which are apparent in Fig. 2.

The normal frequency of generators 4 and 5 should be as nearly as possible that of the normal frequency of the alternating current causing the disturbance, and indeed, it is desirable that the motor 22 driving the correcting generators and commutators shall be a motor of the synchronous type deriving its current from the power system or circuit causing the disturbance. If this be done, and if the phase relation between the voltage at such motor and the voltage of the disturbance be practically constant, it is possible to dispense with one of the correcting generators, the phase of the other generator being adjusted once for all to correspond with the phase of the disturbance. If there be a difference between the actual frequency of the current in circuit 3 and the normal frequency of generators 4 and 5, the actual frequency generated by combination of the component frequencies of generators 4 and 5, under the control above described, will be the same as the actual frequency in circuit 3.

This is illustrated in Fig. 3. Fig. 3 also shows the correcting generator connected between the ground terminal of the communication system and the terminal bus bar of that system; that being the desirable location for the correcting generator or generators when the source of the disturbance is at or near one terminal of the line. It is immaterial, in a general sense, whether the influence of the correcting generator or generators is introduced into control line 11 and communication lines 12 inductively, as by the transformer 6—7 shown in Fig. 1, or by placing the correcting generator or generators directly in said lines 11 and 12, as in Fig. 3. In Fig. 3 I have not shown the telegraph transmitting and receiving instruments and generators of the system of communication in detail, but have represented them diagrammatically by $x$ marks.

The method and apparatus above described are equally applicable to the correction of or compensation for alternating current ground potential. Fig. 3 may be understood to represent this condition also, control conductor 11 being understood to extend to a point sufficiently distant to be free from the earth potential disturbance, and there to be grounded. If disturbance of earth potential exist at grounding point 1, a current will flow through conductor 11 to the distant grounding point, except as such disturbance be neutralized by the correcting generator or generators, as previously described.

Fig. 4 shows a somewhat simplified correcting arrangement, in that provision to prevent hunting of the correcting generators is not made; such provision being not always necessary. A polar relay, 23, has its magnet coil in control conductor 11, and by means of its contact points controls the flow of current from opposed batteries 24 through the magnet coils of polar relays 25 and 26; the current from batteries 24 being rectified, as to relays 25 and 26, by a rotary rectifier or commutator 27, operating in synchronism with the correcting generators 4 and 5; which rectifier also distributes the current from said batteries to relays 25 and 26 alternately. Each such relay has two opposed magnet coils, which receive current alternately, so that the armature is caused to vibrate. The armature and contact points of each relay control the passage of current from opposed batteries 28 through the field of the corresponding correcting generator. It is clear that in the operation of this apparatus, if the correction be not practically complete, the armature of relay 23 will be caused to linger against one or the other of its contact stops sufficiently to cause the armature of one or the other of relays 25 and 26 to correspondingly linger (the particular armature which so lingers and the side on which it lingers depending upon the character of correction required), thereby prolonging the period of energization of the corresponding generator field coil and causing that generator to build up in voltage to effect the correction.

In Fig. 4, each correcting generator has a transformer 6—7 independent of that of the other generator. In a broad sense, it is immaterial whether each generator have its own transformer as in Fig. 4, or whether the two generators operate in series through the primary of a single transformer, as in Fig. 1. In both cases, the currents of the two generators are combined, as induced in conductors 11 and 12.

The arrangement shown in Fig. 5 is similar to that shown in Fig. 4, except that, the motor 22 which drives the correcting generator, being driven from the source of alternating potential disturbance, and being a synchronous motor, only one correcting generator, 1, is required. Also, in the Fig. 5 arrangement the current for the operation of field control relay, 25, is supplied by a transformer 29—30, from alternating current source 3, and that relay has only one magnet coil, distributing rectifier 27 being omitted.

What I claim is:

1. The herein described method of correcting for alternating current disturbance in systems of communication which comprises opposing to the disturbing alternating voltage a voltage of the same frequency and phase and of opposite sign and automatically regulating such opposing voltage in accordance with variations of the disturbing voltage.

2. The herein described method of correcting for alternating current disturbance in systems of communication which comprises operating a plurality of alternating current generators at substantially the frequency of the disturbing alternating voltage and with a phase difference between them, combining the currents produced by said generators, and regulating the voltage produced by said generators to produce a combined alternating voltage of substantially the same frequency and phase as the disturbing voltage but of opposite sign, and opposing the disturbing voltage in such system of communication with the combined voltage so created.

3. The herein described method of correcting for alternating current disturbance in systems of communication which comprises producing an alternating correcting voltage of substantially the same frequency and phase as the disturbing voltage but of opposite sign and opposing the disturbing voltage in such system by said correcting voltage, and automatically regulating the value of such correcting voltage by flow of current in a control conductor exposed, like such system, to the influence of the alternating current disturbance.

4. The herein described method of correcting for alternating current disturbance in systems of communication, which comprises operating a plurality of alternating current generators at substantially the frequency of the disturbing alternating voltage and with a phase difference between them, combining the currents produced by said generators and in so doing producing a combined correcting voltage of substantially the same frequency and phase as the disturbing voltage but of opposite sign and opposing the disturbing voltage in such system by said correcting voltage, and controlling separately the voltage produced by each such generator by flow of current in a control conductor exposed, like such system, to the influence of the alternating current disturbance.

5. The herein described method of correcting for alternating current disturbance in systems of communication which comprises operating two alternating current generators at substantially ninety degrees phase difference respectively and at substantially the frequency of the disturbing voltage, combining the currents produced by said generators and regulating the voltage produced by said generators to produce a combined alternating voltage of substantially the same frequency and phase as the disturbing voltage but of opposite sign, and opposing the disturbing voltage in said system of communication with the combined voltage so created.

6. The herein described method of correcting for alternating current disturbance in systems of communication, which comprises operating two alternating current generators at substantially ninety degrees phase difference respectively and at substantially the frequency of the disturbing voltage, combining the currents produced by said generators and controlling separately the voltage produced by each of such generators by flow of current in a control conductor exposed, like such system, to the influence of the alternating current disturbance, and thereby producing a combined correcting voltage of substantially the same frequency, phase and value as the disturbing potential, but of opposite sign, and opposing the disturbing voltage in such system with the said correcting voltage so produced.

7. The combination with a system of communication comprising a main conductor and a control conductor, of alternating current generating means, comprising means for opposing the influence of the voltage generated thereby to alternating current voltage otherwise present in said main and control conductors, and automatic means, operated by flow of current through said control conductor, for regulating the voltage produced by such generating means.

8. The combination with a system of communication comprising a main conductor and a control conductor, of alternating current generating means, comprising means for opposing the influence of the voltage generated thereby to alternating current voltage otherwise present in said main and control conductors, and automatic means, operated by flow of current through said control conductor, for regulating the phase of the voltage produced by such generating means.

9. The combination with a system of communication comprising a main conductor and a control conductor, of alternating current generating means, comprising means for opposing the influence of the voltage generated thereby to alternating current voltage otherwise present in said main and control conductors, and automatic means, operated by flow of current through said control conductor, for regulating the value and phase of the voltage produced by such generating means.

10. The combination with a system of communication, of alternating current generating means comprising means for opposing the voltage generated thereby to alternating current voltage otherwise present in said system, and automatic means for controlling the opposing voltage so generated in accordance with the said voltage otherwise present in the system.

11. The combination with a system of communication, of alternating current generating means comprising means for opposing the voltage generated thereby to alternating current voltage otherwise present in said system, and automatic means for controlling the phase of the opposing voltage so generated to correspond in phase with the said voltage otherwise present in the system.

12. The combination with a system of communication, of alternating current generating means comprising means for opposing the voltage generated thereby to alternating current voltage otherwise present in said system, and automatic means for controlling the value and phase of the opposing voltage so generated to correspond in phase with the said voltage otherwise present in the system.

13. The combination with a system of communication, of alternating current generating means comprising means for opposing the voltage generated thereby to alternating current voltage otherwise present in said system, and comprising also automatic field control means operated in accordance with flow of alternating current in such system.

14. The combination with a system of communication, of a plurality of alternating current generators comprising means for opposing the voltage generated thereby to alternating current voltage otherwise present in said system, and comprising also field control means operated in accordance with flow of alternating current in such system and operating to regulate such generators separately but in harmony to produce an opposing voltage corresponding in phase and value to the said alternating current voltage otherwise present in the system.

15. The combination with a system of communication, of two alternating current generators arranged to operate at the same frequency but at approximately ninety degrees phase difference and comprising means for opposing the voltage generated by them to alternating current voltage otherwise present in the system, and field control means for said generators operated in accordance with alternating current flow in said system and comprising means for regulating the voltage produced by said generators separately but in harmony to produce an opposing voltage corresponding in phase and value to the said alternating current voltage otherwise present in the system.

16. The combination with a system of communication, of a control conductor, alternating current generating means comprising means for opposing the voltage generated by it to alternating current voltage otherwise present in said system and control conductor, and field control means for said generating means comprising relay means controlled by current flow in said control conductor.

17. The combination with a system of communication, of a control conductor, alternating current generating means comprising means for opposing the voltage generated by it to alternating current voltage otherwise present in said system and control conductor, and field control means for said generating means comprising relay means controlling duration and direction of current flow through the field, other relay means controlled by current flow in said control conductor, and current rectifying means operating in synchronism with said alternating current generating means and operating in connection with one of said relay means to rectify the operating current thereof.

18. The combination with a system of communication, of a control conductor, two alternating current generators arranged to operate at the same frequency but at approximately ninety degrees phase difference, and comprising means for opposing the voltage generated by them to alternating current voltage otherwise present in said system and control conductor, and field control means for said generators comprising relay means controlled by current flow in said control conductor.

19. The combination with a system of communication, of a control conductor, two alternating current generators arranged to operate at the same frequency but at approximately ninety degrees phase difference, and comprising means for opposing the voltage generated by them to alternating current voltage otherwise present in said system and control conductor, relay means controlling duration and direction of current flow through the fields of said generators, other relay means controlled by current flow in said control conductor, and current rectifying means operating in synchronism with said alternating current generators and operating in connection with one of said relay means to rectify the operating current thereof.

20. The combination with a system of communication, of a control conductor, alternating current generating means comprising means for opposing the voltage generated by it to alternating current voltage otherwise present in said system and control conductor, and field control and hunting preventing means for said generating means comprising means controlled by current flow in said control conductor.

21. The combination with a system of communication, of a control conductor, alternating current generating means comprising means for opposing the voltage generated by it to alternating current voltage otherwise present in said system and control conductor, and field control and hunting preventing means for said generating means comprising self-vibrating relay means controlling duration and direction of flow of current through the field of said generating means and itself controlled by current flow through said control conductor.

22. The combination with a system of communication, of a control conductor, alternating current generating means comprising means for opposing the voltage generated by it to alternating current voltage otherwise present in said system and control conductor, and field control and hunting preventing means for said generating means comprising two polar relays arranged each to reverse the other and together constituting a self-vibratory relay combination, one of said relays comprising means for reversing by its vibration the flow of current through the field of said generating means, the other of said relays comprising means for its control by the current flowing through said control conductor, and means for rectifying, with respect to said last-mentioned relay, the current flowing through said control conductor.

In testimony whereof I have signed this specification in the presence of two subscribing witnesses.

JOSEPH W. MILNOR.

Witnesses:
H. M. MARBLE,
PAUL H. FRANKE.